No. 872,564. PATENTED DEC. 3, 1907.
J. L. HOTT.
HAY STACK OR RICK PROTECTOR.
APPLICATION FILED SEPT. 5, 1907.
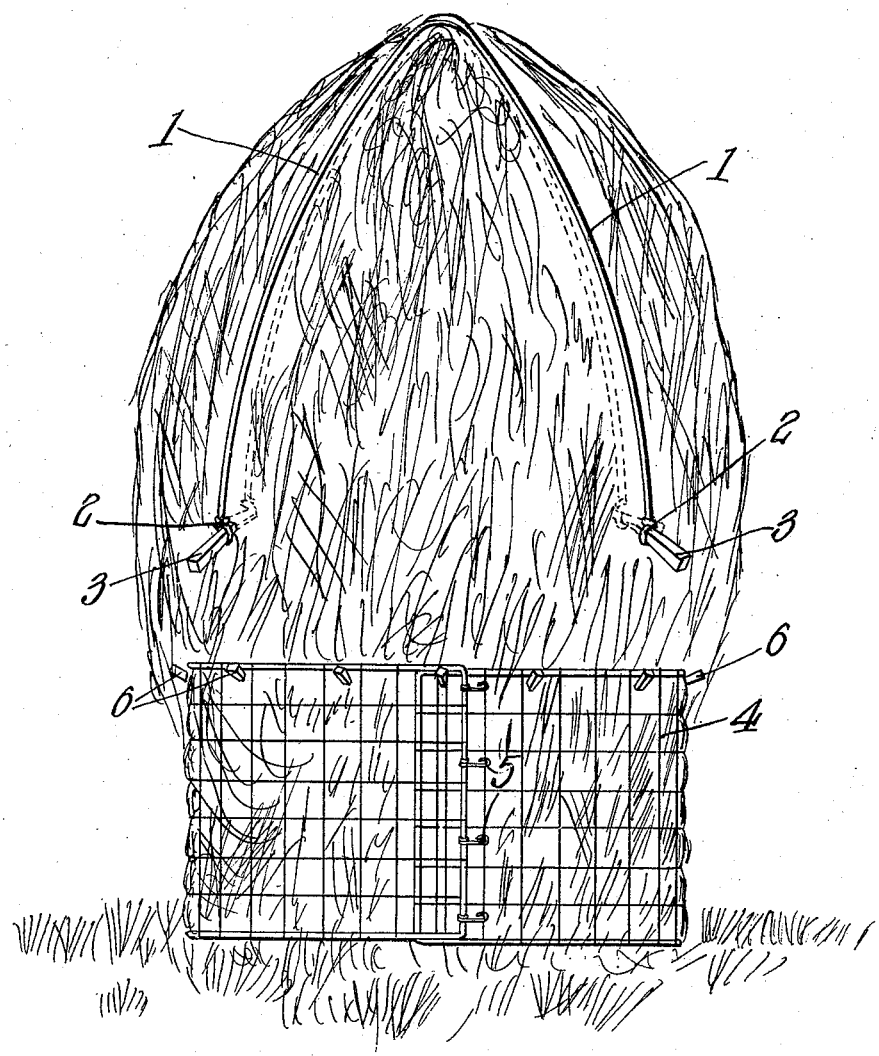
Witnesses:
F. B. Wooden
R. M. Elliott
Inventor,
James L. Hott,
By C. A. Snow & Co.
Attorneys.

UNITED STATES PATENT OFFICE.

JAMES LUTHER HOTT, OF LAHMANSVILLE, WEST VIRGINIA.

HAY STACK OR RICK PROTECTOR.

No. 872,564.  Specification of Letters Patent.  Patented Dec. 3, 1907.

Application filed September 5, 1907. Serial No. 391,509.

*To all whom it may concern:*

Be it known that I, JAMES L. HOTT, a citizen of the United States, residing at Lahmansville, in the county of Grant and State of West Virginia, have invented a new and useful Hay Stack or Rick Protector, of which the following is a specification.

This invention relates to a hay stack or hay rick protector.

The object of the invention is to render the stack or rick practically storm-proof,—that is to say, effectively resistant to heavy wind storms, and further to protect the stack or rick from small animals, such as sheep and goats, as well as from larger animals, such as horses and cattle, so that the base of the rick will not be eaten away, and its stability therefore diminished.

A further object is to protect hay and straw in such manner that as the mass settles it may always be kept under sufficient draft or tension to prevent its being blown down.

With the above and other objects in view as will appear as the nature of the invention is better understood, the same consists in the novel hay stack or rick protector hereinafter fully described and claimed.

In the accompanying drawings forming a part of this specification and in which like characters of reference indicate corresponding parts, the figure is a view in side elevation displaying the manner in which a hay stack is protected.

In carrying the invention into effect, two or more wires 1 are crossed over the top of the rick or stack and brought down on each side, and the ends of the wires are formed into loops 2 through which are inserted pointed sticks 3 that are thrust into the hay and constitute anchors. As the hay settles, the sticks are removed and inserted further down in the stack, whereby the wires or holding members 1 are at all times kept under the requisite tension to secure the objects sought.

To protect the base of the stack or rick from the attacks of small animals such as goats or sheep, or from larger animals, a girdle 4 is employed which is preferably constructed of woven wire fabric of any preferred mesh, and is of a length entirely to encircle the stack and of a height sufficient to prevent larger animals, such as horses and cattle from reaching over its upper edge and eating the hay.

The ends of the girdle may be secured together in any preferred manner, as by providing one end with a plurality of hooks 5 adapted to engage with the wires of the adjacent end. To sustain the girdle against yielding to pressure, sticks or anchors 6 are employed which are inserted through the upper meshes of the girdle and into the stack in the same manner as that described in connection with the anchors 3.

Owing to the fact that the anchors may readily be removed it will be seen that it will require no great amount of labor to retain the holding wires under sufficient stress or strain at all times to secure the object sought.

What is claimed is:—

A hay stack protector comprising a plurality of crossed wires having their terminals provided with loops, separate anchors passing through the loops and adapted to be thrust into the hay of the stack, an open work metallic girdle adapted to surround the base of the stack and provided with means for holding its ends interlocked, and anchors adapted to pass through the meshes of the girdle and into the hay of the stack.

In testimony that I claim the foregoing as my own, I have hereto affixed my signature in the presence of two witnesses.

JAMES LUTHER HOTT.

Witnesses:
 ISAAC V. INSKEEP,
 CHARLES REXROAD.